United States Patent

[11] 3,538,987

| [72] | Inventor | Clyde L. Taylor |
| | | Visalia, California |
| [21] | Appl. No. | 408,572 |
| [22] | Filed | Nov. 3, 1964 |
| [45] | Patented | Nov. 10, 1970 |
| [73] | Assignee | Leslie Ford Williams |
| | | Buttonwillow, California |

[54] AGRICULTURAL APPARATUS FOR SHAPED BEDS
3 Claims, 6 Drawing Figs.

[52] U.S. Cl. ............................................. 172/60,
172/68, 172/78, 172/112, 172/123, 172/701,
172/741; 111/7
[51] Int. Cl. ............................................. A01b 33/02
[50] Field of Search .......................... 172/68, 70,
71, 72, 122, 121, 123, 185, 157, 554, 508, 509,
510, 185, 177, 112, 60, 78, 701, 741, 540, 175;
111/6, 7, 8, 10, 11, 85

[56] References Cited
UNITED STATES PATENTS
179,320  6/1876  Kershner ..................... 172/122X

| 379,308 | 3/1888 | Elivell ......................... | 172/540X |
| 815,451 | 3/1906 | Mayhew...................... | 111/85X |
| 1,108,319 | 8/1914 | Bell............................. | 172/185X |
| 2,729,157 | 1/1956 | Webb.......................... | 172/176X |
| 2,753,782 | 7/1956 | Chattin....................... | 172/121X |
| 3,121,973 | 2/1964 | Phillips et al. ............. | 172/175X |
| 3,128,833 | 4/1964 | Johnson et al. ............ | 172/176X |
| 3,194,193 | 7/1965 | Walters ...................... | 172/112X |
| 3,235,012 | 2/1966 | Johnson et al.............. | 172/157 |
| 3,316,865 | 5/1967 | Williams..................... | 172/68X |

FOREIGN PATENTS
570,258  2/1959  Canada ....................... 172/185

Primary Examiner—Robert E. Pulfrey
Assistant Examiner—Alan E. Kopecki
Attorneys—Herbert A. Huebner and Richard M. Worrel ABSTRACT: Agricultural apparatus having bed-forming means for forming the beds and mulching means for mulching the beds after they have been formed by the bed-forming means and means for re-forming the beds after they have been mulched by the mulching means.

INVENTOR.
Clyde L. Taylor

INVENTOR.
Clyde L. Taylor

Patented Nov. 10, 1970

INVENTOR.
Clyde L. Taylor
BY
Attorneys

Patented Nov. 10, 1970

3,538,987

INVENTOR.
Clyde L. Taylor
BY
Attorneys

3,538,987

AGRICULTURAL APPARATUS FOR SHAPED BEDS

This invention relates to an agricultural apparatus and more particularly to an agricultural apparatus for use in mulching the soil and incorporating herbicides and other chemicals into the soil.

In certain agricultural operations and particularly agricultural operations on irrigated land, there is a need for mulching the raised plant beds. In addition, there is a need for apparatus for incorporating herbicides and other chemicals in the plant beds. There is, therefore, a need for agricultural apparatus which will perform such functions.

In general, it is an object of the present invention to provide an agricultural apparatus which can be utilized for mulching and incorporation of chemicals as well as other agricultural operations.

Another object of the invention is to provide apparatus of the above character which is particularly adapted for use on land which is irrigated and which is formed with raised beds.

Another object of the invention is to provide apparatus of the above character in which a number of different operations can be accomplished on one trip over the soil being tilled.

Another object of the invention is to provide apparatus of the above character which is readily adjustable for different sizes of beds.

Another object of the invention is to provide apparatus of the above character in which the herbicide or chemical is applied to predetermined areas of the bed.

Another object of the invention is to provide apparatus of the above character in which the chemical, after being applied, is thoroughly incorporated into the bed.

Another object of the invention is to provide apparatus of the above character in which the depth of incorporation of the chemical can be readily adjusted.

Another object of the invention is to provide apparatus of the above character which can be either of the pull type or which can be utilized with a three-point hitch.

Additional objects and features of the invention will appear from the following description in which the preferred embodiments are set forth in detail in conjunction with the accompanying drawings.

Referring to the drawings.

Figure 1:
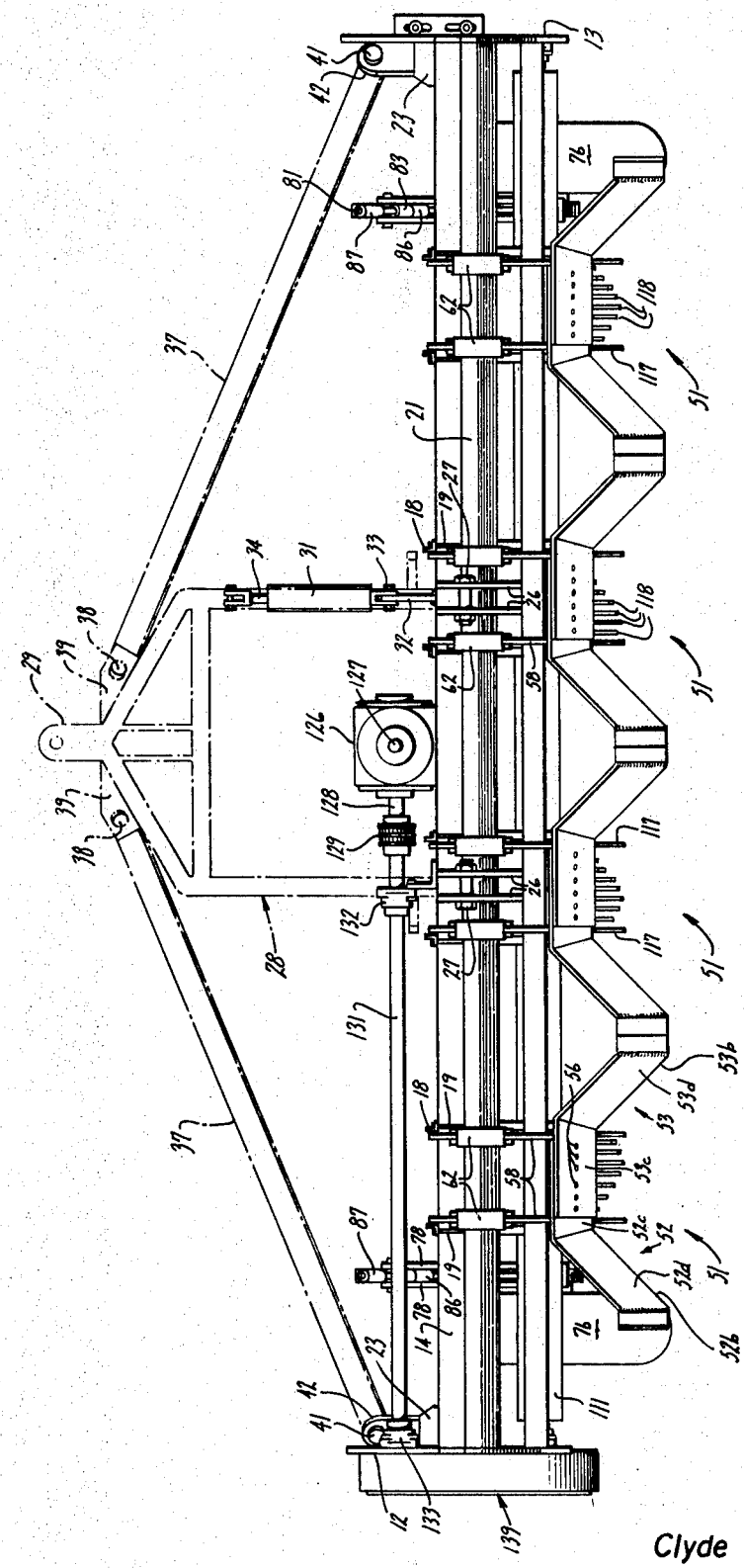
FIG. 1 is a front elevational view of an agricultural apparatus incorporating the present invention.

In general, the agricultural apparatus consists of a framework. A shaft is rotatably mounted on the framework. Bladelike elements are mounted at spaced intervals on the shaft and are adapted to penetrate the soil of the beds over which the apparatus travels. The apparatus also includes means for rotating the shaft so that the bladelike elements are caused to mulch the soil over which the apparatus passes. The apparatus also includes means for reforming beds after they have been worked or mulched by the bladelike elements. This means consists of a cylindrical drum rotatably mounted in the framework. Cone-shaped guide wheels are mounted on the drum and are adapted to engage the side edges of the bed whereby as the apparatus travels over the bed, the drum with the conelike elements serves to reform the bed. In addition, the apparatus is provided with bed forming means which forms the beds. In addition, the apparatus may include other agricultural devices as, for example, it may include means mounted on the framework for applying chemicals such as a herbicide to the beds. The apparatus may also include planters and the like.

As shown in the drawings, the agricultural apparatus consists of a framework 11 which can be of any suitable type. Thus, as shown, it can consist of a pair of side plates 12 and 13. The side plates 12 and 13 are maintained in a spaced parallel relationship by parallel elongate square hollow bars 14, 16 and 17 affixed to and extending laterally between the plates. The bars 14 and 16 are affixed on the upper and lower front portions of the side plates 12 and 13, whereas the bar 17 is affixed to the rear upper portion of the side plates 12 and 13. Longitudinally extending spaced parallel angle members 18 are secured to the bars 14, 16 and 17 by suitable means such as U-bolts 19 which extend around the bars and serve to clamp the members 18 to the bars. The members 18 are arranged in pairs and serve as braces in the framework 11.

Laterally extending tool bars 21 and 22 are mounted on the framework 11. The tool bar 21 is affixed to the side plates 12 and 13 forward of the front bars 14 and 16. The tool bar 22 is mounted to the rear of the framework 11 by support members 23 affixed to the bar 17 and bar clamps 24 affixed to the members 23. The bar clamps 24 are of a type described in copending application U.S. Pat. Ser. No. 245,147, now U.S. Pat. No. 3,252,522 filed Dec. 17, 1962.

Means is provided for attaching the apparatus to a vehicle which is to provide the motive power for the apparatus and consists of plates 26 which are affixed to the upper and lower bars 14 and 16 by suitable means such as welding and to the tool bar 21 by suitable means also such as welding. The plates 26 extend in a direction at right angles to the tool bars 14 and 16 and are spaced apart to form two spaced parallel pairs. Bolts 27 extend through the pairs and serve to pivotally connect the ends of an A-frame 28 to the pairs of plates 26. The A-frame is provided with a hitch 29 which is adapted to be connected to the tractor or vehicle which is to tow or pull the agricultural apparatus.

Figure 3:
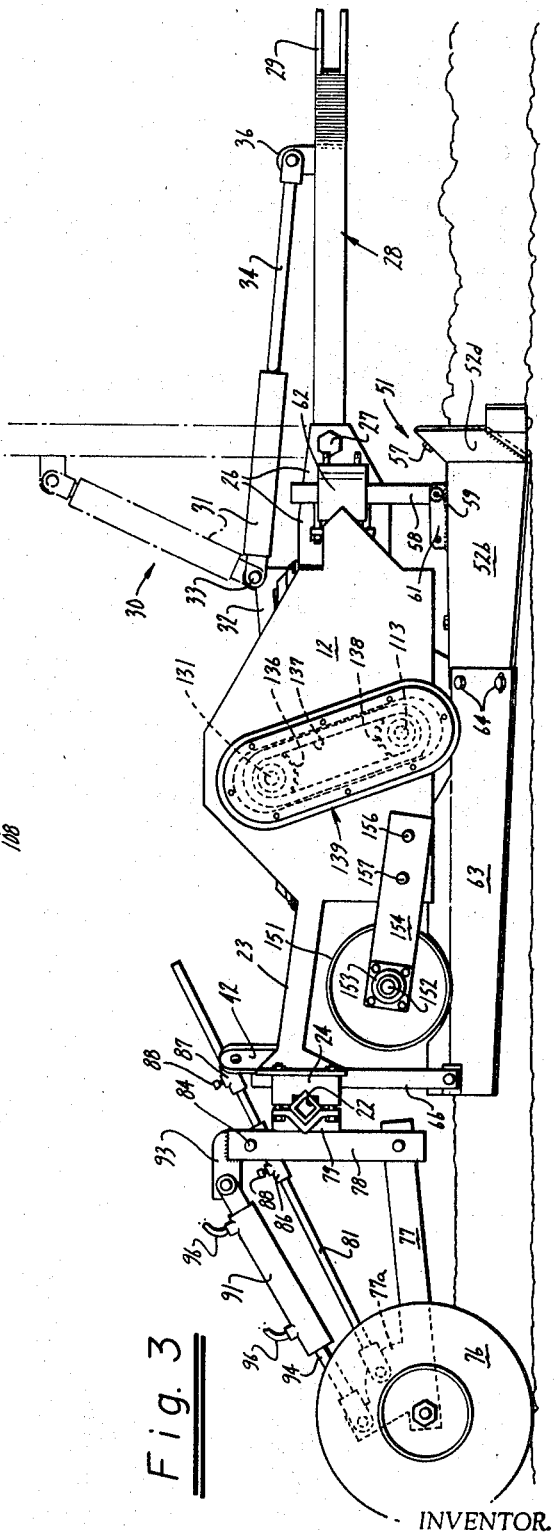
FIG. 3 is a side elevational view of the apparatus shown in FIG. 1.

Means is provided whereby the A-frame 28 and the hitch 29 carried thereby can be moved from the horizontal position shown in FIG. 3 where it is used for conventional pull-type operation and a vertical position indicated in broken lines in FIG. 3 where it is used with a three-point hitch on the tractor. This means consists of actuator means 30 in the form of a hydraulic cylinder 31 which is pivotally connected to a plate 32 by a bolt 33. The plate 32 is secured to the bars 14 and 17. A piston rod 34 of the actuator means 30 is pivotally connected to an ear 36 mounted on the A-frame 28.

Additional means is provided for bracing the A-frame 28 when it is used with a three-point hitch and consists of brace members 37 which are pivotally connected by pins 38 to plates 39 secured to the A-frame 28. The other ends of the brace members 37 are pivotally connected by pins 41 to upstanding ears 42 mounted on plates 23 secured to the side plates 12 and 13 and the bar 17.

The agricultural apparatus shown in the drawings is particularly adapted for use in preparing, planting and treating agricultural land which is to be irrigated. Thus, it includes means for forming raised beds in the form of bed shapers 51 which are mounted upon the framework 11. The bed shapers 51 are generally of the type described in copending U.S. Pat. application Ser. No. 184,086 filed April 2, 1962 now U.S. Pat. No. 3,252,522.

The bed shapers 51 consist of two half sections 52 and 53. The sections 52 and 53 are formed with horizontal portions 52a and 53a, respectively, and downwardly inclined portions 52b and 53b. The sections are also provided with forwardly and upwardly inclined portions 52c and 53c, respectively, and forwardly and laterally inclined portions 52d and 53d, respectively. In order to permit adjustment of the width of the bed to be formed by the bed shapers, the half section 52 is provided with slots 54 and the half section 53 is provided with holes 56 through which bolts 57 extend.

Means is provided for mounting the front end of the bed shapers 51 on the framework 11 and consists of vertical support bars 58 which are secured to each of the half sections 52 and 53 of the bed shapers 51 by suitable means such as bolts 59 which pivotally connect the lower ends of the support bars 58 to brackets 61 secured to the half sections. Bar clamps 62 of the type described in copending application U.S. Pat. Ser. No. 245,147 filed Dec. 17, 1962, are utilized for clamping the support bars 58 to the tool bar 21 and to permit the same to be adjusted vertically with respect to the tool bar 21.

Bed shaper extensions 63 are secured to the rear ends of the sections 52 and 53 by suitable means such as bolts 64. The rear ends of the bed shapers 63 are supported by support bars 66 which are connected to the tool bar 22 by bar clamps 69 indentical to the bar clamp 62. From the arrangement of the bed shapers hereinbefore described, it can be seen that the width of the bed shapers can be readily adjusted by shifting the bar clamps 62 and 69 on the tool bars 21 and 22 and by adjusting the bolts 57, securing the two sections of each bed shaper together.

When the agricultural apparatus is utilized for forming the raised beds, substantially the entire weight of the apparatus is carried by the bed shapers so as to supply sufficient force to form the soil in the bed shapers as the apparatus is pulled behind a suitable vehicle such as a tractor.

Means is provided for raising and lowering the framework with the bed shapers off of the ground so that the agricultural apparatus can be turned around in a field when it is being used as a pull-type operation. This means consists of a pair of rubber-tired wheels 76 rotatably mounted upon a pair of spaced parallel arms 77. The arms 77 have their outer ends pivotally connected to a pair of spaced parallel arms 78 which are secured to bar clamps 79 mounted on the rear tool bar 22. Means is provided for adjusting the vertical position of the wheels 76 with respect to the frame 11 and consists of rods 81 which are pivotally connected to extensions 77a of the arms 77 at points 82. The rods 81 are slidably mounted in sleeves 83 pivotally mounted on the arms 78 by pins 84.

Means is mounted on the rod 81 and adapted to engage the sleeve 83 which provides the upper and lower limits of travel for the wheel with respect to the frame 11 and consists of spaced collars 86 and 87 mounted upon the rods 81. The collars 86 and 87 are adjustable longitudinally of the rods to any desired position on the rods and are fastened in the desired positions by screws 88. The collars 86 determine the uppermost position for the wheels 76, whereas the collars 87 determine the lowermost position for the wheels 76 relative to the framework 11.

Means is provided for moving the wheels 76 between the uppermost and lowermost positions determined by the collars 86 and 87 on the rods 81 and consists of hydraulic actuators 91. The cylinder 92 of each actuator 91 is pivotally connected to a plate 93 affixed to the upper portion of the arm 78 and the piston rod 94 of the actuator is pivotally connected to the extension 77a of the arm 77 as shown particularly in FIGS. 3 and 4. The actuator is provided with piping 96 which is adapted to be supplied with hydraulic fluid from a suitable source as, for example, the source of hydraulic fluid under pressure conventionally provided on the vehicle used for pulling the agricultural apparatus.

From the description of the apparatus thus far described, it can be seen that the wheels 76 can be utilized for raising the framework 11 together with the bed shapers out of the ground so that the apparatus can be turned around in the field when the apparatus is being pulled behind a vehicle. When the agricultural apparatus is connected to the vehicle pulling the apparatus by a three-point hitch, the wheels 76 together with the hydraulic actuators 91 can be utilized to help adjust the depth to which the bed shapers 51 travel.

It is readily apparent that many different types of apparatus can be mounted upon the tool bars 21 and 22 and upon the framework 11 to treat the soil. For example, a soil additive such as a herbicide can be applied with equipment of a conventional type such as that manufactured by International Harvester Corp. Such equipment includes nozzles 101 which are positioned so that they will spray fluid downwardly into openings 106 formed behind the bed shapers 51 and overlying the raised beds. In this way, a herbicide is sprayed onto the raised beds immediately to the rear of the bed shapers 51 and in front of mulcher assemblies 108, hereinafter described, mounted on the framework 11. The supplies are provided with hose fittings 102, which are adapted to be connected by hoses (not shown) to a tank carried on the tractor pulling the agricultural vehicle.

The mulcher assemblies 108 serve to retain the herbicide so that it is only sprayed across the top of the bed as hereinafter described. The mulcher assemblies also serve to incorporate the herbicide into the soil of the bed to a suitable depth as, for example, 3 or 4 inches. Thus, by way of example, the herbicide can be sprayed over a band across the top of the bed approximately 5 to 8 inches on either side of the plants which are to be planted in the bed. In such a case, the herbicide is of the preemergent type and is used for controlling weeds but which will not affect any seeds which are planted in the bed.

The mulcher assemblies 108 are mounted on a hollow square tube 111 which extends laterally across the framework 11. Stub shafts 112 and 113 are affixed in the ends of the square tube 111 and are rotatably mounted in bearings 114 secured to the side plates 12 and 13.

Each of the mulcher assemblies 108 consists of a cylindrical sleeve 116 slidably mounted upon the square tube 111. A pair of circular side plates 117 are mounted on opposite ends of the sleeve. A plurality of incorporating blades are affixed to each of the sleeves 116 and extend radially therefrom. The blades are spaced at different lateral positions on the sleeve 116 and are spaced circumferentially around the sleeve 116 as can be seen from FIG. 4. The blades 118 can be formed in any suitable manner as, for example, by forming them from flat bar stock having suitable dimensions such as 3/8 inch by 2 inches. The blades 118 can also have any suitable length. However, it is desired that the outer extremities of the blades 118 be within the outer circumferential margins of the side plates 117. It is desirable that the side plates 117 extend beyond the blades 118 so that the side plates will keep the herbicide or the chemicals utilized on the soil from sluffing off to the side as the mulching operation takes place as hereinafter described.

Figure 6:
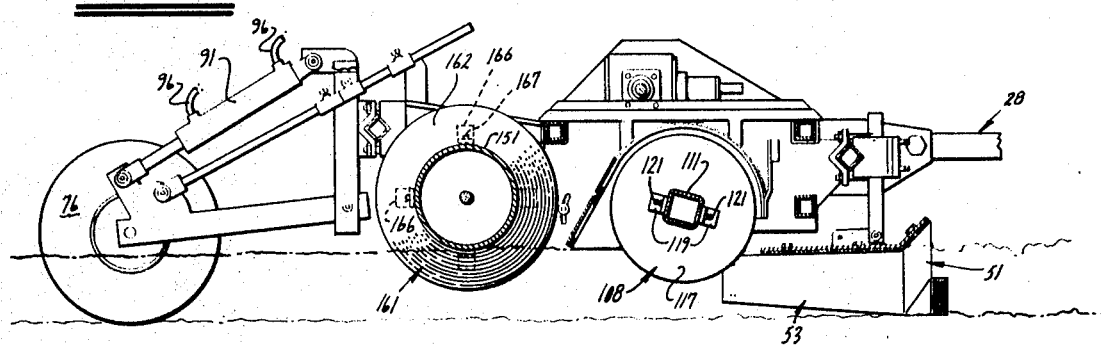
FIG. 6 is a cross-sectional view taken along the line 6-6 of FIG. 5.

Each of the mulcher assemblies 108 can be shifted to any desired position on the square tube 111. They are held in the desired position by brackets 119 (as seen in FIG. 6) which are secured to the outer sides of the side plates 117. Set screws 121 are threaded into the brackets 119 and are adapted to frictionally engage the outer surface of the square tube 111 to prevent movement of the sleeves 116 relative to the tube and to cause the mulcher assemblies 108 to rotate with the tube 111. The mulcher assemblies 108 can have any desired width in order to conduct a mulching operation on any size bed; for example, for a 30-inch bed, a 9-inch mulcher assembly would be satisfactory, whereas for a 40-inch bed, an 18-inch mulcher assembly would be more satisfactory.

Suitable means is provided for rotating the tube 111 and the mulcher assemblies 108 carried thereon as the agricultural apparatus is moved over the soil and consists of a right-angle gear box 126 which is mounted on the frame 11. It has an input shaft 127 which is adapted to be connected to the power takeoff of the vehicle utilized for pulling the agricultural apparatus. It is also provided with an output shaft 128. The output shaft 128 is connected to a slip clutch 129. The clutch 129 drives a shaft 131 which is rotatably mounted in bearings 132 and 133. The bearing 132 is mounted upon an angle member 134 affixed to the bars 14 and 17. The bearing 133 is mounted on the side plate 12. A sprocket 136 is mounted on the outer end of the shaft 131 and drives a chain 137 which drives a sprocket 138 mounted on the shaft 113. A cover 139 is mounted on the side plate 12 and covers the chain 137 and the sprockets 136 and 138. From the foregoing, it can be seen that when the gear unit 126 is operated, the bar 111 with the mulcher assemblies 108 mounted thereon will be rotated to perform the mulching or incorporating operation hereinafter described.

Figure 2:
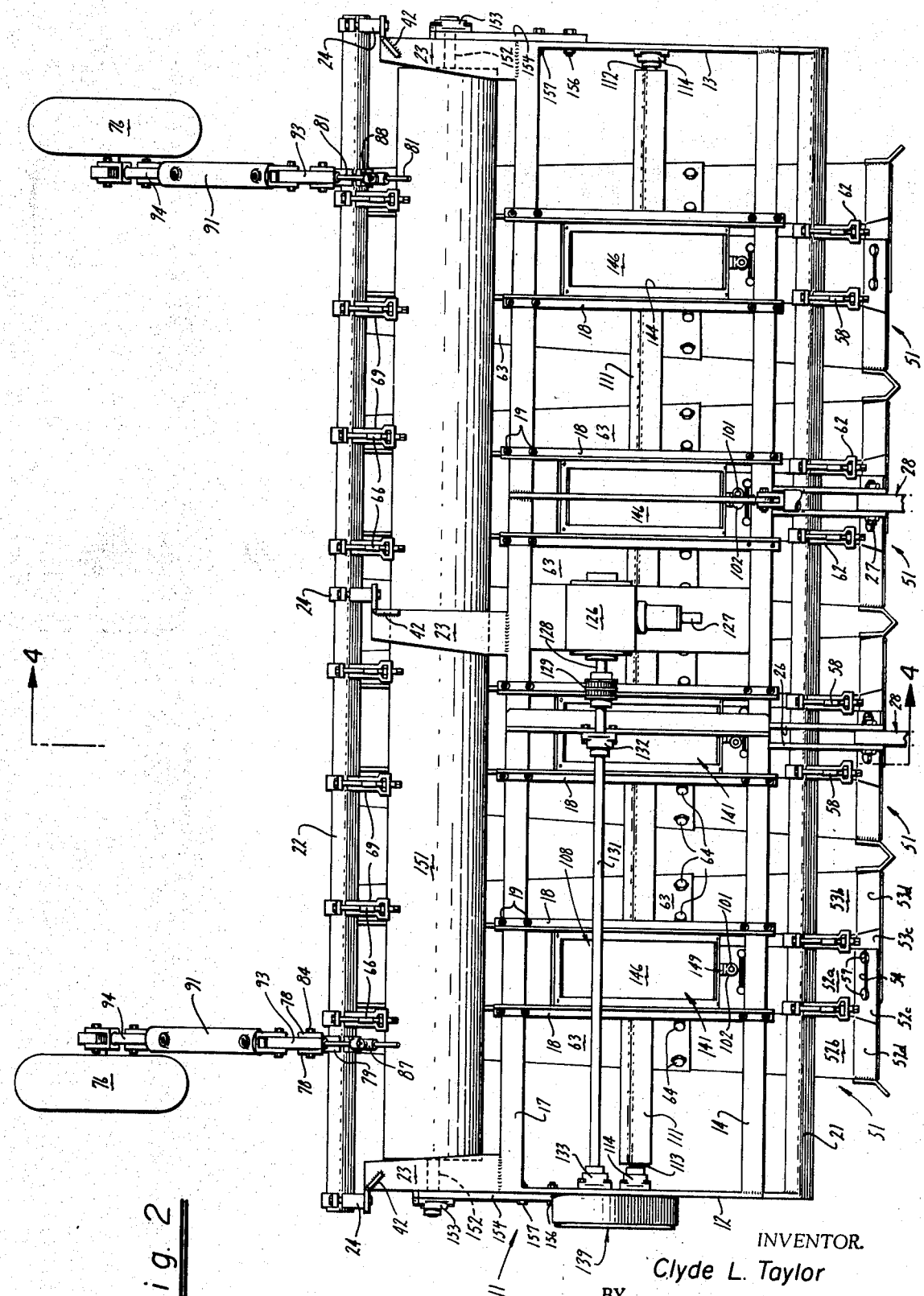
FIG. 2 is a top plan view of the apparatus shown in FIG. 1.
Figure 4:
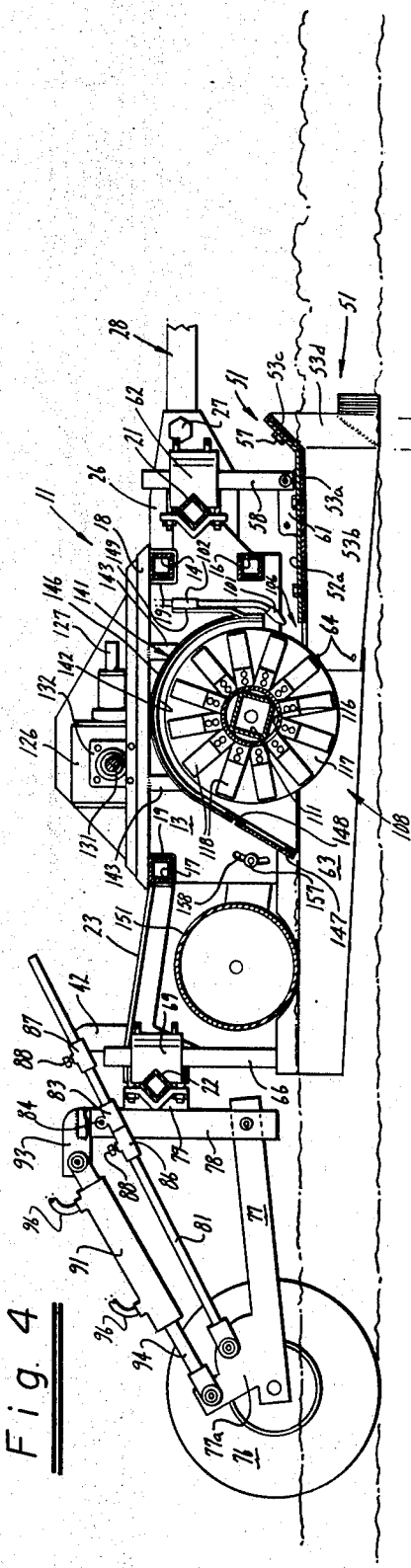
FIG. 4 is a cross-sectional view taken along the line 4-4 of FIG. 2.

A protective cover or shield 141 is associated with each of the mulcher assemblies 108 and consists of a curved plate 142 overlying the mulcher assembly 108 and secured to the frame 11 by members 143. The plate 142 is provided with an opening 144 in which there is mounted a flexible canvas covering 146 (FIG. 2). A flap 147 is secured to the plate 142 by a flexible strap 148 (FIG. 4). The nozzle 101 for each mulcher assembly 108 is supported in a suitable manner such as by a bracket 149 secured to the plate 142.

Means is provided for re-forming the beds after they have been incorporated or mulched by the mulcher assemblies 108 and consists of a large cylindrical roller 151 extending laterally of the framework. Stub shafts 152 are affixed to the ends of the large cylindrical roller 151 and are rotatably mounted in bearings 153 mounted on plates 154. The plates 154 are adjustably secured to the side plates 12 and 13 by bolts 156 and 157. The bolt 156 forms a pivotal connection, whereas the bolt 157 is disposed in a curved slot 158 in the associated side plate to permit the elevation of the roller 151 to be retained in a desired adjusted position. The roller 151 is ground driven and is adapted to compact the top of the bed as the agricultural apparatus is pulled longitudinally of the raised plant beds. At the same time that the top of the bed is being re-formed, the sides of the bed are also being re-formed by the extension members 63 secured to the bed shapers 51 and which extend immediately below the roller 151.

Additional means (not shown) may be mounted on the framework as, for example, planters may be secured to the rear tool bar 22 to plant seeds into the bed after the bed has been sprayed with herbicide, mulched to incorporate the heribicide into the top of the bed and re-formed. Such planters are a well known type and are identified in copending U.S. Pat. application Ser. No. 245,147 filed Dec. 17, 1962. If desired, additional tool bars may be provided on the framework 11 for the mounting of additional apparatus.

From the drawings, it can be seen that the agricultural apparatus shown therein is relatively compact and has a very low profile. As explained previously, it is also a type which can be utilized with a three-point hitch so that the entire agricultural apparatus can be lifted by the tractor, or it can be used as a unit which is towed or pulled behind the tractor. The apparatus is also one which can be readily used by anyone skilled with farm machinery. The depth of penetration of the incorporator units can be controlled by adjusting the vertical positions of the bed shapers 51 with respect to the framework 11. By way of example, the bed shapers can be adjusted so that the mulcher assemblies 108 mulch the soil and mix or incorporate the chemical into the soil to a depth of approximately 3 or 4 inches. The side plates 117 of the mulcher assemblies 108 retain the spray from the nozzles 101 within the top surfaces of the raised beds and thus prevent waste of the chemical with which the soil is being treated. Waste is also reduced by the shield 141 which overlies each of the mulcher assemblies 108.

Figure 5:
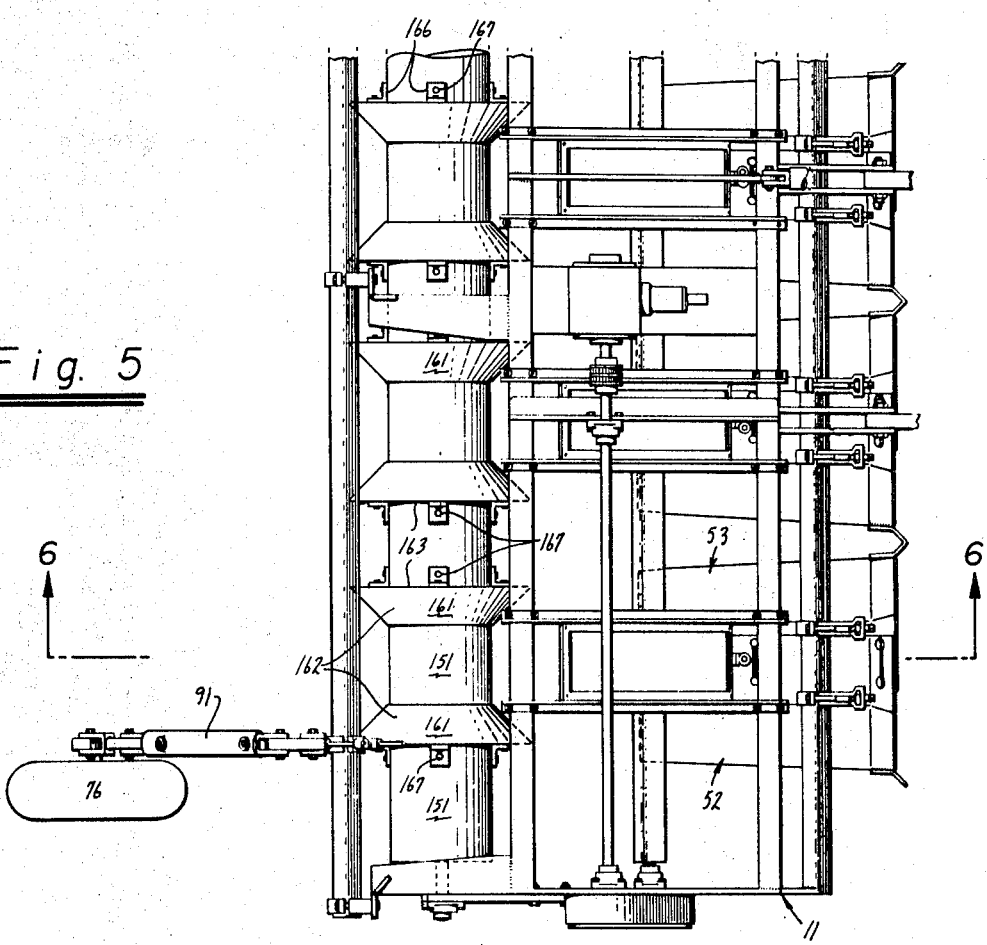
FIG. 5 is a fragmentary plan view of another embodiment of the invention.

As shown in FIGS. 5 and 6 in place of the side plates or extensions 63, cone-shaped guide wheels 161 can be mounted on the roller 151. These guide wheels 161 can be formed of any suitable material such as metal and are provided with an inclined surface 162 and a vertical surface 163. Means is provided for retaining the guide wheels 161 in adjusted positions laterally of the frame 11 and consists of brackets 166 which are secured to the vertical side walls 163 and set screws 167 which extend through the brackets and engage the surface of the roller 151. The guide wheels 161 are arranged in pairs as are the side plates or extensions 63 and are mounted on the roller 151 in such a manner that the inclined surfaces 162 of each pair face each other and form the opposite sides of a bed at the same time that the top surface of the plant bed is being re-formed and compressed by the roller 151. A principal advantage of the cone-shaped guide wheels 161 over the side plates 63 is that they will roll over the surface and this will require less force to move the agricultural apparatus over the soil. The operation of the agricultural apparatus is substantially identical whether the side plates 63 are used or the cone-shaped wheels 161 are used.

The mulcher assemblies 108 are independently driven rather than being ground driven because it has been found that it is possible to obtain more satisfactory mulching or incorporating. This is particularly true when the mulcher assemblies 108 are driven at a speed which is greater than they would be rotated if they were driven by the ground as the apparatus is being pulled over the ground. Thus, by way of example, I have found that it is desirable to rotate the mulcher assemblies at a speed of approximately 250 to 900 r.p.m. It can be appreciated that the higher the speed, the finer the mulch that is obtained. One speed that has been found to be particularly satisfactory for incorporating and mixing chemicals into the soil is a speed of rotation of approximately 465 r.p.m. with a ground speed for the agricultural apparatus of approximately 3 m.p.h.

It is apparent from the foregoing that I have provided a new and improved agricultural apparatus which is particularly adapted for performing many operations in one trip through the field. As can be appreciated, agricultural apparatus of this type is particularly advantageous in that it saves a great deal of time, labor and expense. In addition, the apparatus is of a type which can be readily operated by one person and can be readily moved from one place to another.

I claim:

1. In an agricultural apparatus, a framework, a plurality of bed shapers mounted on the framework and serving to form the earth into a plurality of raised shaped beds in which each of the beds has a top surface and inclined side surfaces, mulching means mounted on the framework adapted to mulch the top surfaces of the beds, an elongated cylindrical bed-reforming roller mounted on the framework in transversely bridging relation between said plurality of bed shapers for rolling engagement with the top surfaces of said beds being formed by the shapers in following relation to the mulching means, and auxiliary bed shaping means carried by the framework in cooperating transversely spaced relation along said roller adjacent to each side of said beds to re-form the sides of the beds after said engagement of the top surfaces of the beds by the roller.

2. The apparatus of claim 1 in which said auxiliary bed shaping means comprises a plurality of side plates secured to said bed shapers in underlying and trailing relation to said roller.

3. The apparatus of claim 2 in which said side plates include transversely aligned arcuate notches through which said roller is extended for engagement with the tops of said beds.